United States Patent [19]

Simms

[11] Patent Number: 4,498,233

[45] Date of Patent: Feb. 12, 1985

[54] RETRIEVAL TOOL FOR SOCKET CONTACTS

[75] Inventor: Charles C. Simms, San Jose, Calif.

[73] Assignee: The United States of America as represented by the Secretary of the Navy, Washington, D.C.

[21] Appl. No.: 412,420

[22] Filed: Aug. 27, 1982

[51] Int. Cl.³ .................... B23P 19/00

[52] U.S. Cl. .................... 29/747; 29/278; 29/758; 294/94

[58] Field of Search .................... 29/739, 741, 747, 758, 29/764, 259, 260, 278, 280; 294/94, 95

[56] References Cited

U.S. PATENT DOCUMENTS

| | | | |
|---|---|---|---|
| 319,095 | 6/1885 | Joel | 81/7 |
| 942,373 | 12/1909 | Bjorn et al. | 7/101 |
| 1,816,446 | 7/1931 | Stapf | 294/100 |
| 2,184,074 | 12/1939 | Gent | 294/100 |
| 3,019,521 | 2/1962 | Clark | 29/278 |
| 3,110,093 | 11/1963 | Johnson | 29/203 |
| 3,136,040 | 6/1964 | Bauer et al. | 29/747 |
| 3,538,585 | 11/1970 | Hendry et al. | 29/203 |
| 3,574,381 | 4/1971 | Ocheltree et al. | 294/94 |
| 3,588,983 | 6/1971 | Hoy | 29/764 |
| 3,614,824 | 10/1971 | Moulin | 29/203 |
| 3,698,058 | 10/1972 | Reimer et al. | 29/200 |
| 3,789,484 | 2/1974 | Morgan | 29/203 |
| 3,811,168 | 5/1974 | Anderson et al. | 29/203 |
| 4,168,569 | 9/1979 | Fairbairn | 29/764 |

OTHER PUBLICATIONS

Article by Wedgelock, Division of Monogram Industries, Incorporated, entitled "Fasteners & Tools".

*Primary Examiner*—Howard N. Goldberg
*Assistant Examiner*—P. W. Echols
*Attorney, Agent, or Firm*—R. F. Beers; C. D. B. Curry; W. C. Daubenspeck

[57] ABSTRACT

Apparatus for seating a very small socket contact in an electrical connector from the front side of the connector. Opposing flexible fingers, which are disposed above and below a flat wedge member and separated thereby, are extended longitudinally by plunger action beyond the wedge member which is fixed relative to the tool housing. The opposing fingers have a bend which causes their ends to come together when the fingers are extended relative to the wedge. The extended fingers and the wedge may freely be inserted into an individual socket contact from the front of the connector. Retraction of the fingers by spring bias causes the wedge to separate the ends of fingers so that knuckles at the ends of the fingers internally grasp the socket contact which may then be pulled for proper seating.

2 Claims, 5 Drawing Figures

RETRIEVAL TOOL FOR SOCKET CONTACTS

BACKGROUND OF THE INVENTION

1. Field of the Invention

This invention relates to seating socket contacts in multiple contact electrical connectors and, in particular, to a tool for seating an individual socket contact from the front side of the connector.

2. Description of Prior Art

In multiple contact electrical connectors, the socket contacts are usually installed in the insulating body from the back of the connector. Frequently, the back of the connector is then sealed, thereby making the contacts inaccessible from the back of the connector. If a socket contact in the completed connector becomes unseated or was not seated properly during installation, the contact must be reseated through the front of the connector or all the contacts must be cut and the entire connector rewired, a very costly and time consuming process.

There are retrieval tools for reseating socket contacts through the front end of the connector. However, the prior art retrieval tools are usually of complex design and may damage the connector if not skillfully used. Furthermore, these prior art retrieval tools do not work well with very small socket connectors such as those using 20 and 22 gage contacts. U.S. Pat. No. 3,614,824 is an example of a tool which may be used for retrieval of unseated socket contacts from the front of the connector. This tool design uses an expansible bushing mechanism to grip the socket contact, a design which does not work well with very small contacts.

SUMMARY OF THE INVENTION

It is therefore the object of the present invention to provide a tool for reliably reseating very small socket contacts from the front of a multiple contact connector.

It is a further object of the present invention to provide such a reseating tool which is of simple design and easily used without damaging the connector.

In the retrieval tool of the present invention, opposing flexible fingers, which are disposed above and below a flat wedge member and separated thereby, are extended longitudinally by plunger action beyond the wedge member which is fixed relative to the tool housing. The opposing fingers have a bend which causes their ends to come together when the fingers are extended relative to the wedge. The extended fingers and the wedge may freely be inserted into an individual socket contact from the front of the connector. Retraction of the fingers by spring bias causes the wedge to separate the ends of fingers so that knuckles at the ends of the fingers internally grasp the socket contact which may then be pulled for proper seating.

Other advantages and features of the present invention will become apparent from the following detailed description when considered in conjunction with the accompanying drawings wherein:

DESCRIPTION OF THE PREFERRED EMBODIMENT

Figure 1:
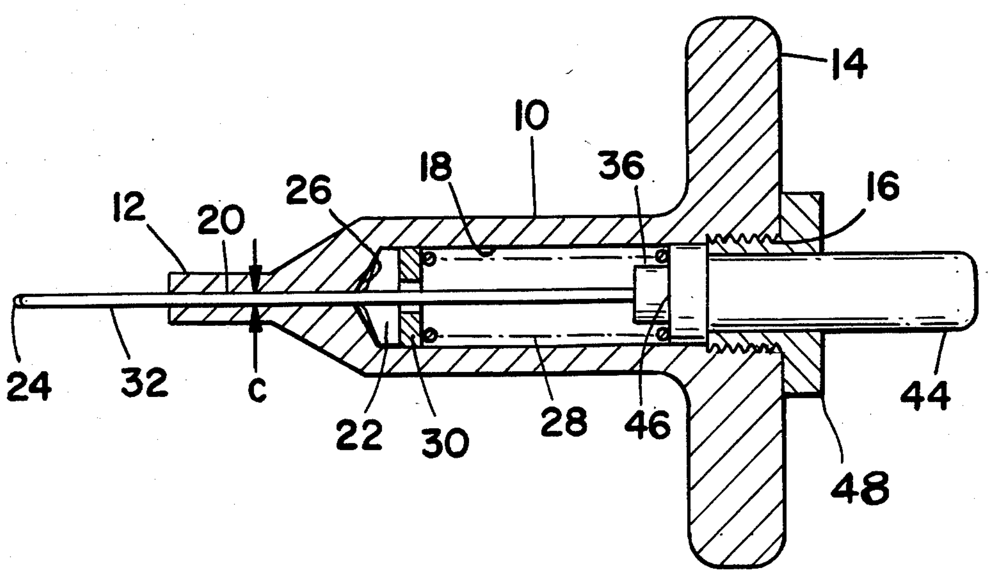
FIG. 1 is a partially cross-sectional top view of the retrieval tool with the fingers unextended.

Referring now to the drawing, the preferred embodiment of a retrieval tool of the present invention has a housing having a cylindrical barrel 10 which tapers to a cylindrical neck 12 at one end and expands to a rectangular handle 14 at the other. The housing has a central bore including a first threaded section 16 which joins an elongated interior section 18. The interior section 18 tapers to a narrow passage 20 through the neck 12.

A flat wedge member has a head section 22 disposed in the interior section 18 and a blade section 24 extending through the narrow output passage 20. The head 22 of the wedge member is shaped to fit against the sloping wall 26 at the end of the interior section 18 of the central bore and is retained against the sloping wall 26 by a helical spring represented by dashed line 28. A washer 30 is disposed between the wedge head 22 and the spring 28 to provide a suitable surface for the spring to press against.

Figure 2:
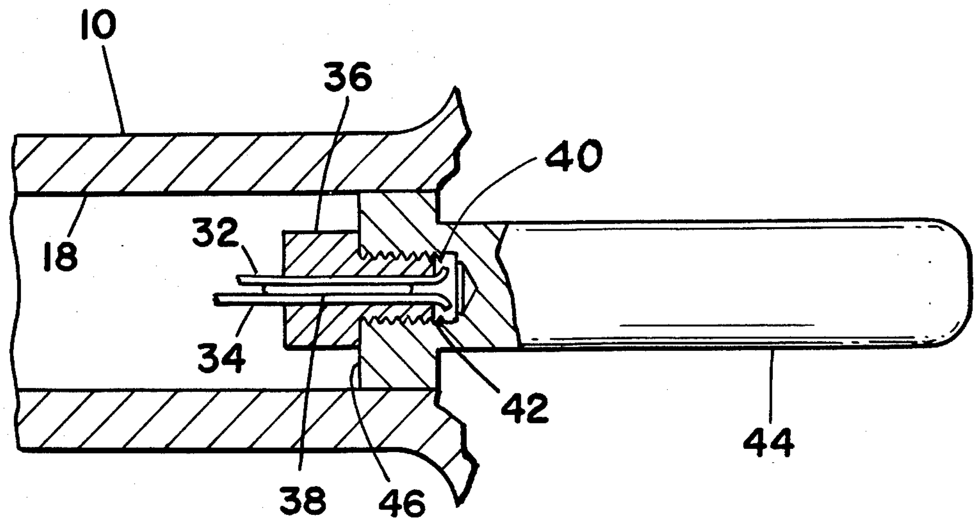
FIG. 2 is an enlarged view showing a portion of the retrieval tool from the side.

A pair of fingers 32 and 34 of spring steel are attached to the inner surface of a collet 36 which is disposed to within the interior section 18 of the central bore as best shown in the enlarged partial view of FIG. 2. The fingers 32 and 34 extend from the collet 36 through the central opening of the spring 28, through the aperture of washer 30, through the narrow passage 20, and out of the housing, with finger 32 passing above the wedge and finger 34 passing below the wedge. A spacer 38 having the same thickness as the wedge (See dimension D of FIG. 3*c*) is disposed between the fingers 32 and 34 within the collet opening to maintain the fingers in the proper spaced relationship prior to passing above and below the wedge, respectively. The collet 36 has a threaded section 40 by which the collet is fixed in a threaded bore 42 of a plunger 44. The plunger 44 has an annular shoulder 46 which abuts the helical spring 28 and which slides within the interior section 18 of the central bore against the spring force. A T-shaped cap 48 which is threadably attached to the housing at the first threaded section 16 maintains the plunger 44 within the housing. The body of plunger 44 passes through a central aperture in the cap 48 so that the annular shoulder 46 is disposed between the spring 30 and the cap 48.

Figure 3A:
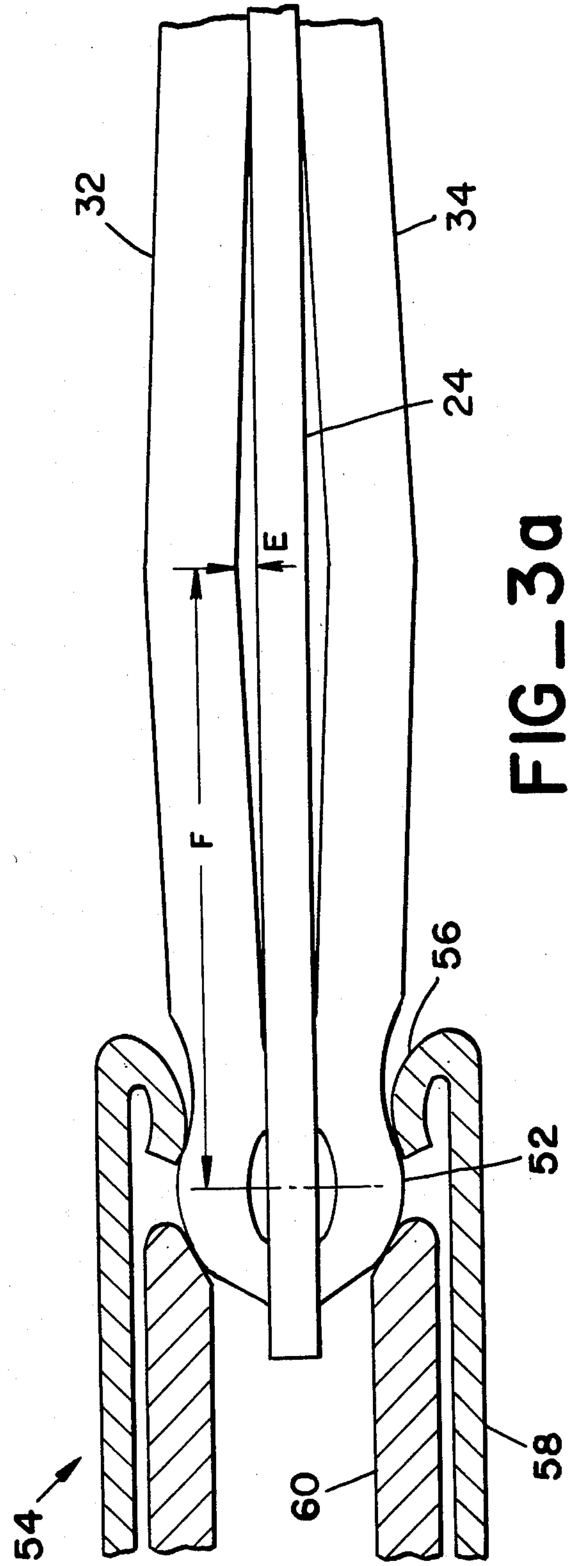
FIG. 3*a* is an enlarged side view of the fingers of the retrieval tool grasping a socket connector.
Figure 3C:
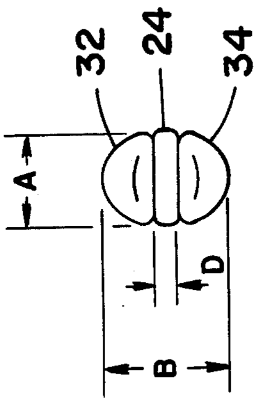
FIG. 3*c* is an end view of the fingers as shown in FIG. 3*a*.
Figure 3B:
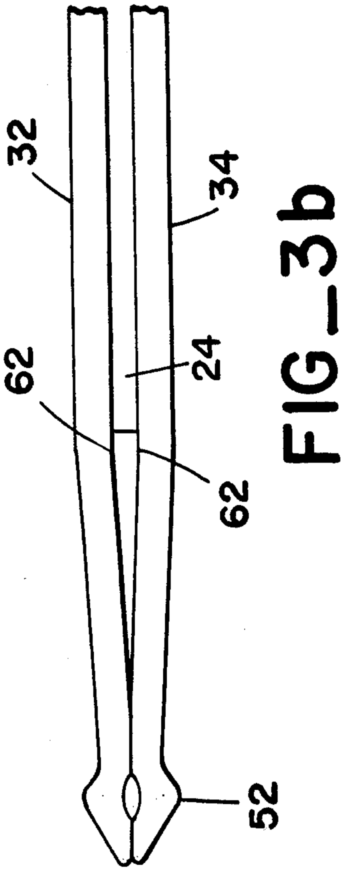
FIG. 3*b* is an enlarged side view of the fingers of the retrieval tool when extended.

Referring now to FIGS. 3*a*–3*c*, each opposing finger 32 and 34 has a knuckle 52 formed at the end. The knuckles 52 are shaped to internally grasp a socket contact 54 between the folded flange 56 of the contact sleeve 58 and the contact collet 60 when the blade 24 of the wedge is disposed between the knuckles as shown in FIG. 3*a*. The fingers which have a semi-circular cross-section (see FIG. 3*c*) are bent inward toward each other at 62 so that the ends come together as shown in FIG. 3*b* when not separated by the blade 24 of the wedge. This allows the opposing fingers to enter the socket contact freely when they are extended.

The retrieval tool is used to seat an improperly seated contact as follows: The plunger 44 is depressed relative to the housing of the tool against the force of spring 28. The travel of the plunger 44 relative to the housing, produces an equal travel of the collet 36 and the attached fingers 32 and 34. Since the wedge is fixed relative to the housing, the fingers 32 and 34 are extended beyond the end of the wedge blade 24 and come together as shown in FIG. 3*b*. The fingers 32 and 34 and the wedge blade 24 may now be freely inserted into the improperly seated socket contact 54 from the front of the connector. With the fingers 32 and 34 and the wedge blade 24 disposed in the socket contact, the plunger is slowly released against the spring 28 so that, as the fingers are slowly retracted into the housing, they are slowly separated by the stationary wedge to grasp the contact between the folded flange 56 and the collet 60. The retrieval tool may now be pulled away from connector body to exert a forward reseating force on the socket contact 54.

As a further illustration of a preferred embodiment of a retrieval tool according to the present invention, the following table gives representative dimensions identified by letters in the figures for both a 20 gage tool and a 22 gage tool:

| Dimension Identification | Socket Size 20 | 22 | Comments |
| --- | --- | --- | --- |
| A | .037" | .029" | See FIG. 3c |
| B | .050" | .040" | See FIG. 3c |
| C | .052" | .043" | diameter of bore 20 |
| D | .010" | .008" | See FIG. 3c |
| E | .006" | .005" | See FIG. 3a |
| | .157" | .148" | stroke of plunger |
| F | .110" | .110" | See FIG. 3a |

Obviously many modifications and variations of the present invention are possible in light of the above teachings. It is therefore to be understood that within the scope of the appended claims the invention may be practiced otherwise than as specifically described.

What is claimed is:

1. An apparatus for seating a socket contact in an electrical connector from the front side of the connector, which comprises:

(a) a pair of elongated, parallel, opposing, flexible fingers for insertion into said socket contact, the outside surface of the ends of said fingers being shaped to internally grasp the socket contact when said fingers are forced apart, said fingers having an inward bend near the ends which allows the ends of the fingers to come together so that the fingers may be inserted into the socket contact;

(b) a housing having a central bore including an interior section leading to a narrow output section through which said fingers extend out of said housing for insertion into said socket contact;

(c) a wedge member disposed between said fingers, said wedge member being fixed relative to said housing and having a blade section which extends through said narrow output section out of said housing;

(d) means for extending said fingers beyond the end of said wedge member and for retracting said fingers so that said wedge member extends beyond the ends of said fingers, said means for extending and retracting comprising:

(1) plunger means slidable in the interior section of said central bore, said fingers being coupled to said plunger means so that said fingers are extended by depressing said plunger means, (2) spring means disposed in the interior section of said central bore for opposing the depression of said plunger means to retract said fingers, whereby the extension of said fingers allows said fingers and said wedge to be inserted into said socket contact whereupon the retraction of said fingers causes the wedge member to force apart said fingers to internally grasp said socket contact so that said fingers may be pulled to seat the contact.

2. Apparatus as recited in claim 1 wherein said wedge member has a head section which is disposed in the interior section of said central bore, said head section being maintained fixed in said interior section by said spring means.

* * * * *